(12) United States Patent
Schuler et al.

(10) Patent No.: US 9,683,464 B2
(45) Date of Patent: Jun. 20, 2017

(54) METHOD FOR PRODUCING A CAMSHAFT MODULE AND CORRESPONDING CAMSHAFT MODULE

(71) Applicant: Amtek Tekfor Holding GmbH, Offenburg (DE)

(72) Inventors: Markus Schuler, Oberwolfach (DE); Joachim Echle, Oberwolfach (DE)

(73) Assignee: Amtek Tekfor Holding GmbH, Offenburg (DE)

( * ) Notice: Subject to any disclaimer, the term of this patent is extended or adjusted under 35 U.S.C. 154(b) by 77 days.

(21) Appl. No.: 14/421,571

(22) PCT Filed: Aug. 16, 2013

(86) PCT No.: PCT/DE2013/000461
§ 371 (c)(1),
(2) Date: Feb. 13, 2015

(87) PCT Pub. No.: WO2014/026669
PCT Pub. Date: Feb. 20, 2014

(65) Prior Publication Data
US 2015/0192040 A1 Jul. 9, 2015

(30) Foreign Application Priority Data
Aug. 16, 2012 (DE) .................. 10 2012 016 357

(51) Int. Cl.
*F01L 1/04* (2006.01)
*B21K 3/00* (2006.01)
(Continued)

(52) U.S. Cl.
CPC .............. *F01L 1/047* (2013.01); *B23P 11/00* (2013.01); *F01L 1/026* (2013.01); *F01L 1/053* (2013.01);
(Continued)

(58) Field of Classification Search
CPC . F01L 1/047; F01L 1/053; F01L 1/026; F01L 2001/0537; F01L 2001/0476;
(Continued)

(56) References Cited

U.S. PATENT DOCUMENTS

| | | | | | |
|---|---|---|---|---|---|
| 4,719,682 | A | * | 1/1988 | Santi | F16H 55/12 29/416 |
| 4,835,832 | A | * | 6/1989 | Arnold | F01L 1/047 29/445 |

(Continued)

FOREIGN PATENT DOCUMENTS

| | | |
|---|---|---|
| DE | 33 21 846 A1 | 12/1983 |
| DE | 197 10 847 C2 | 1/1999 |

(Continued)

OTHER PUBLICATIONS

Machine Translation of DE 102010048225.*

(Continued)

*Primary Examiner* — Sarang Afzali
*Assistant Examiner* — Darrell C Ford
(74) *Attorney, Agent, or Firm* — Crowell & Moring LLP (57) ABSTRACT

A method for producing a camshaft module and a camshaft module are provided. The camshaft module includes a camshaft and a bearing frame having bearing devices with cut-outs. The camshaft includes a shaft and cams having cut-outs. The shaft has at least two different outside diameters. At least some of the cams and/or some of the bearing devices have cut-outs of differing diameters. The bearing frame is supported during shaft insertion to be movable along a movement axis during production of the camshaft module and to be substantially rigid along an insertion direction of the shaft. The shaft is inserted into the bearing frame in the insertion direction in such a way that interference fit is obtained in each case at least between the shaft and (Continued)

at least some of the cams. A predefined target distance between two elements such as a gear located outside of the bearing frame and a cam or bearing device located inside of the bearing frame adjacent to the element outside of the bearing frame may be obtained by partially inserting the shaft, determining a distance between the two elements, and applying an insertion force to the shaft based on the determined distance to advance the shaft to result in setting the distance between the two elements to the target distance.

10 Claims, 4 Drawing Sheets (51) Int. Cl.
B21D 53/88 (2006.01)
F01L 1/047 (2006.01)
B23P 11/00 (2006.01)
F16H 53/02 (2006.01)
F01L 1/02 (2006.01)
F01L 1/053 (2006.01)

(52) U.S. Cl.
CPC ........ *F16H 53/025* (2013.01); *B23P 2700/02* (2013.01); *F01L 2001/0471* (2013.01); *F01L 2001/0476* (2013.01); *F01L 2001/0537* (2013.01); *F01L 2103/00* (2013.01); *F01L 2103/01* (2013.01); *Y10T 29/49293* (2015.01); *Y10T 74/2101* (2015.01)

(58) Field of Classification Search
CPC ............... F01L 2103/01; F01L 2103/00; F01L 2001/0471; F16H 53/025; B23P 11/00; B23P 2700/02; Y10T 74/2101; Y10T 29/49293
USPC ... 29/897.2, 888.01, 888.08, 407.05, 407.08, 29/407.09, 407.1; 123/90.6
See application file for complete search history.

(56) References Cited

U.S. PATENT DOCUMENTS

| | | | | |
|---|---|---|---|---|
| 5,201,246 A * | 4/1993 | Arnold | ................ | F01L 1/047 123/90.6 |
| 6,182,361 B1 * | 2/2001 | Cox | ................ | B23K 11/002 29/523 |
| 6,324,902 B1 * | 12/2001 | Kang | ................ | F01L 1/047 73/114.79 |
| 7,246,588 B2 * | 7/2007 | Takano | ................ | F01L 1/022 123/90.27 |
| 7,610,831 B2 * | 11/2009 | Burgler | ................ | B23P 11/00 74/567 |
| 7,775,186 B2 * | 8/2010 | Sakurai | ................ | B21D 53/845 123/90.16 |
| 8,887,681 B2 * | 11/2014 | Wiesner | ................ | F01L 13/0036 123/90.6 |
| 2004/0111883 A1 * | 6/2004 | Merz | ................ | B23K 11/11 29/888.1 |
| 2004/0134063 A1 * | 7/2004 | Vogel | ................ | B21D 53/845 29/888.1 |
| 2007/0034184 A1 * | 2/2007 | Dengler | ................ | F01L 1/08 123/90.17 |
| 2007/0180694 A1 * | 8/2007 | Burgler | ................ | B23P 9/02 29/888.1 |
| 2009/0000591 A1 * | 1/2009 | Kumagai | ................ | F01L 1/047 123/195 C |
| 2009/0137327 A1 * | 5/2009 | Waseda | ................ | B21D 53/845 464/183 |
| 2010/0147104 A1 * | 6/2010 | Ueno | ................ | F01L 1/047 74/567 |
| 2011/0041790 A1 | 2/2011 | Ilgeroth et al. | | |
| 2011/0283961 A1 * | 11/2011 | Meusel | ................ | F01L 1/047 123/90.1 |
| 2012/0079913 A1 | 4/2012 | Dollinger et al. | | |
| 2013/0220068 A1 | 8/2013 | Echle et al. | | |
| 2013/0283613 A1 * | 10/2013 | Walter | ................ | B21D 53/845 29/888.06 |
| 2016/0346880 A1 * | 12/2016 | Schmid | ................ | F16C 35/063 |

FOREIGN PATENT DOCUMENTS

| | | |
|---|---|---|
| DE | 20 2006 018 359 U1 | 3/2007 |
| DE | 10 2006 005 333 A1 | 8/2007 |
| DE | 10 2007 056 638 A1 | 5/2009 |
| DE | 10 2008 024 877 A1 | 11/2009 |
| DE | 10 2008 007 091 B4 | 6/2010 |
| DE | 10 2009 018 413 A1 | 10/2010 |
| DE | 10 2009 024 455 A1 | 1/2011 |
| DE | 10 2009 051 636 A1 | 5/2011 |
| DE | 10 2010 021 904 A1 | 12/2011 |
| DE | 10 2010 048 225 A1 | 5/2012 |
| EP | 0 892 156 A1 | 1/1999 |
| GB | 2 121 908 A | 1/1984 |
| JP | 8-110275 A | 4/1996 |
| JP | 9-89077 A | 3/1997 |
| JP | 2000-329214 A | 11/2000 |
| WO | WO 2007/012407 A1 | 2/2007 |

OTHER PUBLICATIONS

International Search Report dated Oct. 22, 2013 with English translation (eight (8) pages).
German Search Report dated Jun. 13, 2013, including partial English translation (ten (10) pages).

* cited by examiner

METHOD FOR PRODUCING A CAMSHAFT MODULE AND CORRESPONDING CAMSHAFT MODULE

CROSS REFERENCE TO RELATED APPLICATIONS

This application is a National Phase of PCT International Application No. PCT/DE2013/000461, filed on Aug. 16, 2013, which claims priority under 35 U.S.C. §119 from German Patent Application No. 10 2012 016 357.6, filed Aug. 16, 2012, the entire disclosures of which are herein expressly incorporated by reference.

BACKGROUND AND SUMMARY OF THE INVENTION

The invention relates to a method for producing a camshaft module and a camshaft module. The camshaft module includes at least one camshaft and a bearing frame having bearing devices. The camshaft comprises at least one shaft and cams having cut-outs. The cut-outs likewise comprise the bearing devices.

Camshafts generally comprise a carrier element (also referred to as a pipe or shaft) and cams. It is also possible for additional functional elements such as bearing rings, angle transmitters or gears to be provided. When used in engines, the camshafts serve as part of the valve train, wherein the carrier element rotates about the longitudinal axis thereof. As a result of the cams, the rotational movement is converted into longitudinal movements so as to control the intake and exhaust valves of the engine.

A number of variants of camshafts, of the components thereof or of the production method are already known in the prior art. In the case of what are known as composite camshafts, the cams and other functional elements are produced separately and applied to the shaft.

The camshafts are typically applied to the cylinder head of the respective internal combustion engine by way of bearing points and attached there after production. For this purpose, the camshafts must be aligned with the cylinder head and with each other. For the bearing arrangement, split bearings are therefore required, for example, so as to be able to place the shaft in these bearings. As an alternative, the bearings, or bearing components, are already applied during production of the camshaft to the respective camshaft, in addition to the cams and remaining functional elements.

So as to simplify the production of engines, in some instances camshaft modules are used, which accommodate in particular two camshafts in corresponding bearings and are applied to the cylinder head as one unit during the actual assembly of the engines.

In a further development step, in the prior art the methods of manufacturing the camshaft are in some cases combined with the manufacture of the camshaft module. As a result, the camshafts are no longer produced individually and then introduced in the respective module, but the camshafts are produced within the module. Appropriate adjustments and adaptations must be made to the camshaft or the module based on the general circumstances (such as the shape of the module due to the design of the cylinder-head cover, space constraints, materials used).

German Patent Document No. DE 10 2010 048 225 A1 describes a method for producing camshafts, wherein a shaft is pushed through cut-outs of the individual functional elements (such as cams), and a press fit is obtained in each case by the design of the shaft and of the functional elements. During introduction of the shaft, the functional elements are held by holding elements, which in turn are disposed inside a frame. Sensors are located in the holding elements, which measure the force that is exerted by the shaft on the functional elements during production. Based on these measured values, it is possible to determine the level of torque that can be transmitted via the connection between the functional element and the shaft. In other words: by way of the force with which the shaft acts on the cams, it is possible to calculate, for example proceeding from reference measurements, how rigid the connections are, ensuring they can transmit torque up to a certain limit value without the connection detaching.

German Patent Document No. DE 10 2010 021 904 A1 describes the production of a composite camshaft, wherein the shaft has differing outside diameters. During production, the shaft is pushed through the functional elements that are disposed behind one another. A cover between sections of the shafts and the continuous cut-outs of the functional elements achieves smoothened sections of the shaft.

German Patent Document No. DE 197 10 847 C2 discloses a composite camshaft, during the production of which the separately produced cams are applied to receiving projections of a shaft. The outside diameters of the receiving projections become smaller in a direction of the shaft. For attachment of the cams, the inside cut-outs thereof or the receiving projections have axial teeth, which generate a connection between the cam and the shaft in each case in a chip-removing manner when the cams are applied to the shaft.

German Patent Document No. DE 10 2008 007 091 B4 describes a camshaft module, in which two produced camshafts are rigidly connected to a cylinder-head cover by way of bearing brackets.

German Patent Document No. DE 10 2009 051 636 A1 describes a production of a camshaft module, in which the camshafts are produced within the module. For this purpose, in one step the individual functional elements are threaded with the respective associated tolerance ring on the shaft. Subsequently, an axial relative movement between the tolerance ring and the functional element generates an interference fit between the functional element, tolerance ring and shaft.

The essential aspect during production is that the orientation of the camshafts with respect to each other and the orientation of the cams within the individual camshaft is not changed by the production process. The orientation of the cams with respect to each other is essential for valve timing when the module is installed.

A particular problem area frequently results from the gears, by way of which the camshafts are rotated, and the axial bearings, which define the support region of the camshaft module on the engine block. The problem here arises from the fact that the shafts can be easily deformed by the cams, by other functional elements, bearings or the like as a result of the force that occurs when it is pushed through, whereby fluctuations in the axial distances of the components with respect to each other can occur. The gears are typically disposed so as to abut a bearing bracket. The distance between an axial bearing and the gear must not be too small, however, because otherwise the unobstructed rotation of the gear, and thus of the camshaft, could be impeded.

It is therefore the object of the invention to provide a production method for a camshaft module, which allows high manufacturing accuracy and small dimensional deviations, wherein in particular the occurrence of interfering forces during and after production in the camshaft module is prevented.

The method according to the invention, in which the above-derived and above-described object is achieved, is initially and essentially characterized in that the shaft is created and/or machined in such a way that the shaft has at least two different outside diameters, at least some of the cams and/or some of the bearing devices are created and/or machined in such a way that the cut-outs of the cams and/or the cut-outs of the bearing devices have differing diameters, the bearing frame is held in such a way that the bearing frame, during production of the camshaft module, is movable along at least one movement axis and substantially rigid along an insertion direction of the shaft, the cams are disposed relative to the bearing frame in such a way that the cams—in particular by the elevations thereof—are aligned with each other, and the diameters of the cut-outs of the cams and the diameters of the cut-outs of the bearing devices become smaller in the insertion direction, and the shaft is inserted in the insertion direction into the bearing frame at least through the cut-outs of the cams and the cut-outs of the bearing devices in such a way that the outside diameter of the shaft increases against the insertion direction, and a respective interference fit is obtained in each case at least between the shaft and at least some of the cams. In one embodiment, all cams are attached to the shaft by way of interference fit. In one embodiment, an interference fit is also generated between the shaft and at least some of the bearing devices.

According to the invention, the bearing frame, which in particular allows installation on the engine block, is at least partially floatingly mounted, which is to say it can give way to a certain degree, which is determined by the elements used for mounting, as a result of the forces acting on the bearing frame. For this purpose, spring elements, which allow a movement and subsequently act in a restoring manner, are preferably provided in the devices for mounting the bearing frame. The functional elements—such as cams—and other bearing devices—such as bearing rings or bearing brackets—are either part of the bearing frame, or are disposed in the same for production in such a way that they move together with the same. As an alternative, elements are also held separately from the bearing frame, however they are disposed so as to assume their final position already inside the camshaft module. By way of the floating bearing arrangement, self-centering of the bearing frame can be achieved as a result of the movement of the shaft, so that in particular damaging forces or stresses or the like are avoided. For example, some of the bearing devices comprise rolling bearings or rolling bodies, which preferably should not be subjected to any axial or radial forces during production. The floating bearing arrangement thus allows the configuration to give way.

The shaft moreover has a stepped design, wherein the components (such as cams, bearing rings, the bearing devices in general, or the functional elements in general), through the cut-outs of which the shaft is guided during production, are provided with matching inside diameters of the cut-outs thereof. Due to the stepped design of the shaft and the arrangement of the components corresponding to the diameters of the cut-outs, the shaft can be inserted up to a certain preliminary position, without any force being exerted on the components surrounding the shaft. A force action does not occur initially since the shaft is introduced with the smallest diameter facing forward, and the diameters of the cut-outs decrease in the movement direction, so that the shaft is first guided through the larger inside diameters. A clearance thus essentially exists between the shaft and the functional elements (such as cams) or the bearing devices (such as bearing rings, bearing brackets) on those components that are not joined to each other, and an interference fit results for the components that are to be joined to each other. In one embodiment, multiple functional elements or cams and/or bearing devices following one another in the arrangement in the bearing frame are thus provided with the same inside diameter of the cut-outs. As a result, not all inside diameters of the cut-outs must differ; for the method according to the invention they only have to be located in a such way, relative to the bearing frame, that it is possible to guide the shaft through all components.

In one variant, the components forming the camshaft module, which is to say in particular the cams and bearing rings, for example, are already completely machined prior to installation. The bearing rings or bearing brackets are in particular also fully closed components, through the continuous cut-outs of which the shaft is pushed and subsequently secured, preferably by way of interference fit.

In one embodiment, the shaft is provided with a knurling at least in some regions.

In one variant, two camshafts are introduced next to each other into the module. Two camshafts are used, for example, for intake and exhaust valve timing.

One embodiment of the method provides for the bearing frame to be created with at least some of the bearing devices. As an alternative or in addition, at least some of the bearing devices are disposed relative to the bearing frame after separate production. The bearing devices are in part bearing rings—such as rolling element bearings—or larger elements, such as bearing brackets. Some of these are integral parts of the bearing frame or are disposed relative to the bearing frame for production.

According to one embodiment, the method is carried out substantially at room temperature. As an alternative or in addition, at least the insertion of the shaft is carried out at a temperature that is substantially identical for the bearing frame and camshaft. In the prior art, individual components are heated, while others are cooled. This complexity is not required with the method according to the invention. Moreover, as an alternative or in addition, the insertion of the shaft is additionally carried out free of a locking agent.

In one embodiment, the force that is applied to the shaft during insertion of the shaft is measured. By monitoring the applied force, the interference fit that is created can be inferred, by way of which the maximal torque can be determined which can be transmitted via the connection—for example between the cams and the shaft.

According to one embodiment, the bearing devices and the cams are fully rough-machined elements, which are designed to be substantially closed around the respective cut-outs. No secondary machining is therefore required, and the production method differs from some of the prior art in particular by the shaft being guided through the cut-outs of the components that are already closed.

To supplement the embodiments of the above-described method, it is also possible to carry out and implement the steps described hereafter. However, the following method also allows a camshaft to be produced without the steps of the method described above. Accordingly it is optionally sufficient for the following method if the camshaft module comprises at least one camshaft that has at least one shaft and cams. The remaining components described above are not absolutely necessary for implementing the following method, but also do not adversely conflict with an implementation of the method. However, individual of the above-mentioned embodiments can also be implemented in the following method.

As an alternative or in addition, the object described above is achieved in a further teaching of the invention by the following method, which consists of partially inserting the shaft in the cut-out of a functional element, determining at least a distance between the functional element and a reference element, comparing the determined distance to a predefinable target distance and generating a comparison result, and exerting a force on the shaft based on the comparison result. The force is in particular such that it causes the shaft to be pushed further into the cut-outs of the functional element or through the same.

So as to optimally achieve the distance between the functional element and the reference element according to the second teaching of the invention, the shaft is initially introduced only partially into the cut-out of the functional element, wherein already a certain tension is created. The certain functional element is in particular the last component, through the cut-out of which the shaft is pushed. In one embodiment, the functional element is thus located opposite the region on which the shaft is inserted into the bearing frame. The insertion of the shaft into the cut-out of the functional element already causes a certain force to act. After insertion, the movement of the shaft is stopped, and a distance between the functional element and a reference element is measured and compared to a target value. Starting from the resulting comparison result, which is to say in particular starting from the difference between the measured value and the target value, a force is then exerted on the shaft, which brings the shaft to the final position, so that in particular the distance between the functional element and the reference element corresponds to the target value.

The above-described method can be employed for a specific functional element, or also for further functional elements, cams or bearing devices of the camshaft or of the camshaft module. The method can thus also be employed separately from the above-described method, or be used to supplement the same.

According to one embodiment, the distance is determined while the shaft and/or the functional element are free of a force that is exerted on the shaft or on the functional element. Thus, no force from the outside acts during the time during which the distance is measured or determined; only the force that has already built between the shaft and the functional element is the one that acts.

In a further embodiment, the shaft is partially inserted into the cut-out of the functional element in such a way that the distance between the functional element and the reference element is greater than the predefinable target distance. In this embodiment, the movement of the shaft causes the distance between the functional element and the reference element to be reduced, whereby the movement of the shaft is stopped at the moment at which further action of a force would further reduce the distance. If, as an alternative, the movement causes the distance to become larger, the movement of the shaft would be interrupted at the moment at which it is to be expected that the distance is smaller than the target distance.

According to one embodiment, the functional element is a gear and the reference element is an axial bearing.

Finally, the invention relates to a camshaft module that has been produced according to at least one of the above-described embodiments.

DETAILED DESCRIPTION

Figure 1:
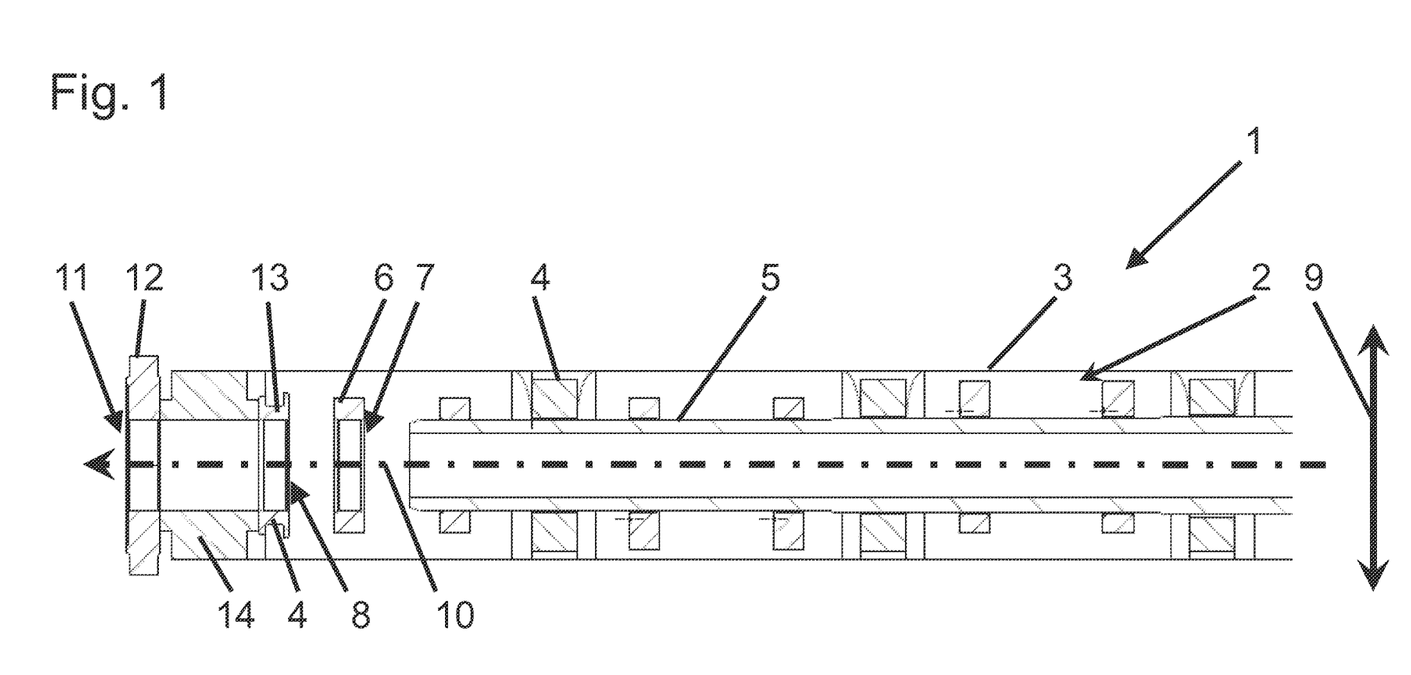
FIG. 1 shows a schematic sectional view of a camshaft module during production, illustrating essentially the functional causal relationships in accordance with an embodiment of the present invention.

FIG. 1 shows a camshaft module 1 during production. The camshaft 2 is created and the camshaft 2 is introduced in the bearing frame 3 in one operation. During further processing, the camshaft module 1 is attached to an engine block via the bearing frame 3. For this purpose, the bearing frame 3 carries the camshaft 2, holding the same rotatably in the bearing device 4. The bearing devices 4 are in part bearing brackets, or also bearing rings or other elements used for a bearing arrangement, such as rolling bearings.

For production, the shaft 5 of the camshaft 2 is guided through all components that, subsequently during operation, rotate along with the camshaft 2 or are used for the bearing arrangement or mounting, or also for the force transmission to or from the camshaft 2. The shaft 5 is thus guided in particular through the cams 6 or the cut-outs 7 thereof. The components to be joined, which is to say the individual parts of the camshaft module 1, in particular have substantially the same temperature, and the joining process preferably also takes place without a locking agent, anti-friction agent or lubricant.

In addition, the shaft 2 is also guided through the cut-outs 8 of the bearing devices 4.

A particular adjustment consists of the shaft 5 having a stepped design (here with three different outside diameters), and of the continuous cut-outs of the bearing devices 4 and of the cams 6, or of further functional or bearing elements, being suitably designed around the shaft 2, which is to say these cut-outs also do not have the same diameters. The components having cut-outs, which subsequently make contact with the shaft 2, are thus disposed so that the diameters of the cut-outs are either substantially constant or decrease in one direction.

For the joining process—which is to say for introducing the shaft 5 and for joining, in particular in each case by way of interference fit, to the elements of the camshaft 2 or of the bearing frame 3—the bearing frame 3 is held so as to be able to carry out movements in multiple directions. For example, a movement along the movement axis 9 is possible, which here extends substantially perpendicularly to a longitudinal axis of the bearing frame 3. As a result of this mobility, the bearing frame 3 is able to move relative to the shaft 5 to a certain degree, which can be predefined via the setting of the elements holding the bearing frame 3, or self-centering of the bearing frame 3 and of the components located therein is achieved.

The shaft 5 is introduced along the insertion direction 10, wherein the shaft 5 is inserted with the smallest outside diameter first.

In the illustration, the shaft 5 has been introduced into the bearing frame 3 up to a certain preliminary position, at which the shaft 5 has not yet exerted a force on the surrounding elements, since sufficient clearance still exists between the elements and the shaft 5 as a result of the stepped shape of shaft 5 and the cut-outs adjusted thereto. If, in the next step, the shaft 5 is pushed further in the insertion direction 10, initial contact is made, which the bearing frame 3 is able to accommodate. The bearing arrangement along the axis of the insertion direction 10 is not movable, however, which is to say the bearing frame 3 is held rigidly in the insertion direction 10 or against the insertion direction 10. The floating bearing arrangement allows the bearing frame 3 to automatically respond to manufacturing tolerances or deviations in the arrangement from an aligned arrangement of the cut-outs of the components behind one another.

Figure 2:
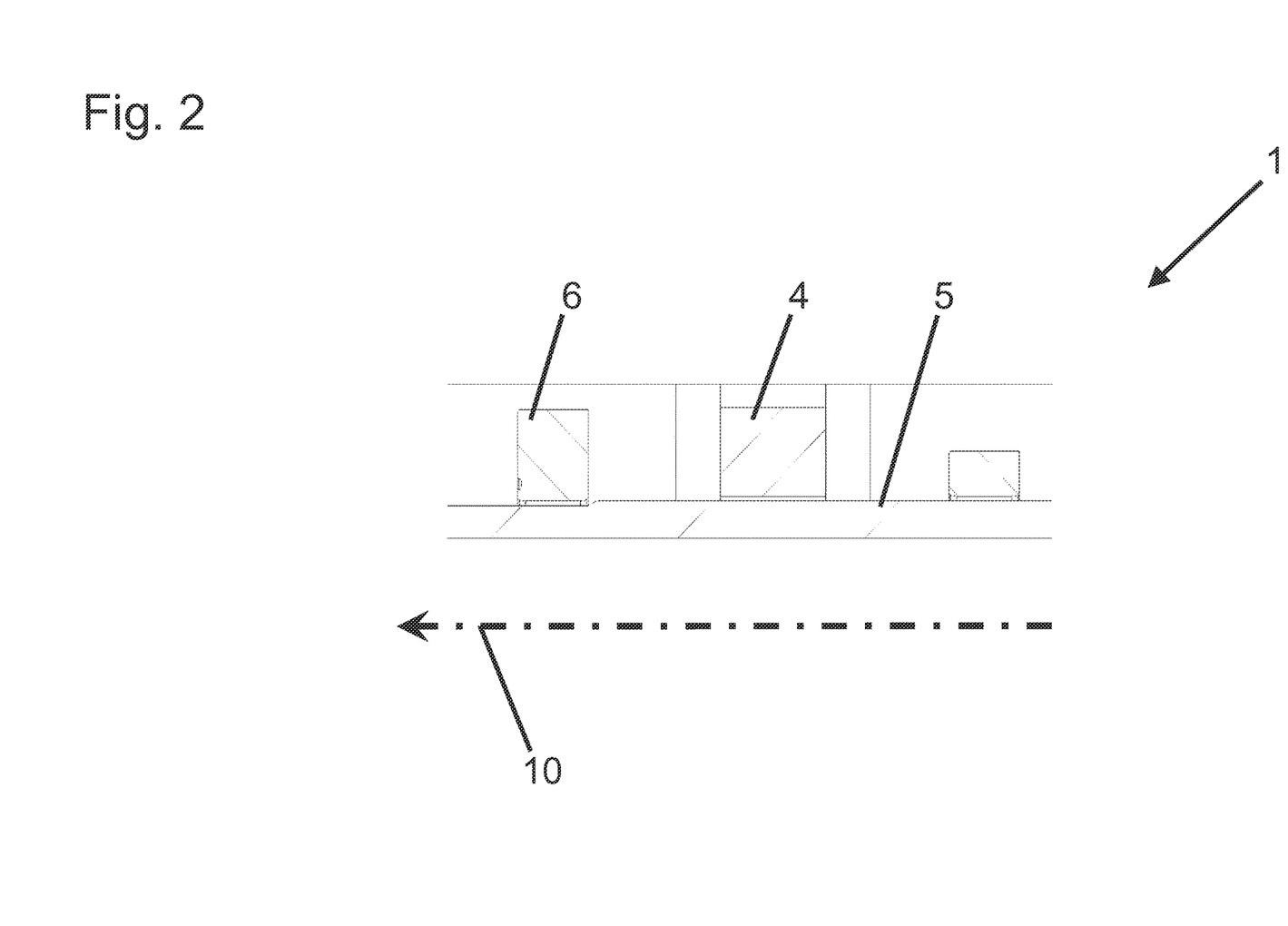
FIG. 2 shows an enlarged section of the camshaft module of FIG. 1.

FIG. 2 shows the effect of the stepped design of the shaft 5, as a result of which sufficient clearance still exists between the shaft 5 and the cams 6 in the state shown in FIG. 1. By further movement in the insertion direction 10, the clearance between the shaft 5 and cams 6 is eliminated. An interference fit then develops as a result of the overlap of the components. A bearing device 4 within a bearing bracket is also apparent in FIG. 2, which allows the camshaft to rotate about the longitudinal axis thereof when the camshaft module 1 is fully installed in the engine.

A gear, as a special functional element 12 of the camshaft 2, can also be seen in FIG. 1 at the left end of the drawing. The camshaft 2 is driven in the engine by way of this gear 12. In particular the distance between the functional element 12 and the adjoining bearing device 4 in the form of an axial bearing 13, which in the present example serves as a reference element, is relevant for this purpose. An end piece 14 of the bearing frame 3, which essentially is a piece of wall, is located between the two. If the distance is set too small, frictions can thus develop at the end piece 14, which is to say unobstructed running of the camshaft 2 is impeded. However, the distance also must not be too large, since in particular the gear 12 must have the proper position in relation to other elements of the engine, which are not shown here. When the interference fit is generated between the shaft 2 and the functional element 12, special consideration is thus given to this fact by employing a two-part insertion of the shaft 2 in the cut-out 11 of the functional element 12.

Figure 3:
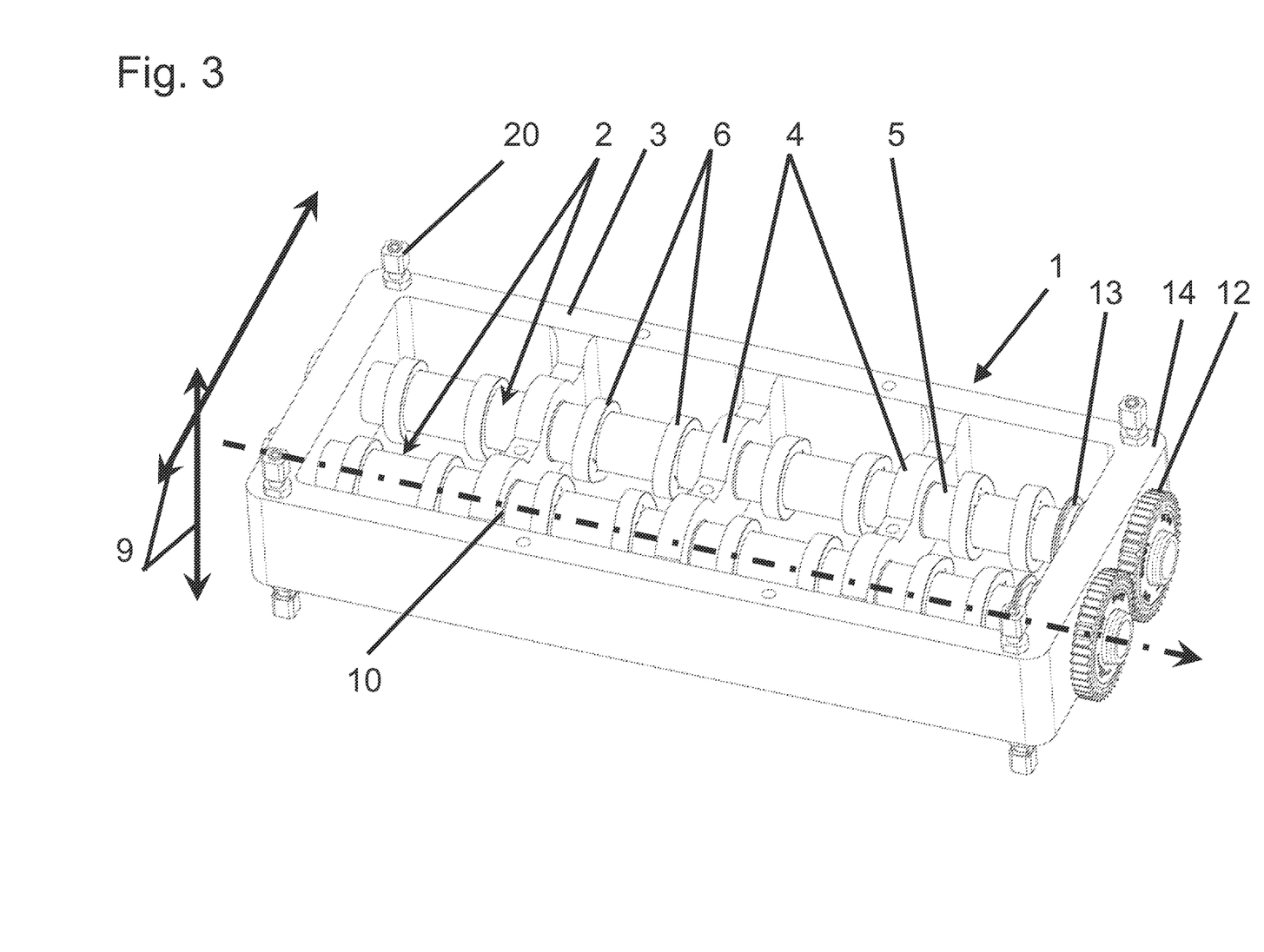
FIG. 3 shows a top view onto a schematic camshaft module in the held state during production in accordance with an embodiment of the present invention.

FIG. 3 shows a camshaft module 1 having two camshafts 2, which are disposed next to each other in the bearing frame 3 and are mounted by way of multiple bearing brackets as the bearing devices 4. The shafts 5 are joined to the cams 6 by way of interference fit.

During production, the two shafts 5 were introduced in each case into the bearing frame 3 in the insertion direction 10, wherein the bearing frame is able to move along the movement axes 9, which here are positioned perpendicularly to each other and perpendicularly to the insertion direction 10. To provide the mobility, holding elements 20 are attached to the corners of the bearing frame 3, in which spring elements are introduced. These spring elements allow a certain mobility, however the same is incrementally weakened as the amplitude increases.

On the right side of the drawing, the gears are shown as functional elements 12 of the two camshafts 2 for driving the camshafts 2 in the installed state. It is apparent that the gears 12 are located outside the interior of the camshaft module 1, which is created by the border of the bearing frame 3 and here in particular by the end piece 14 of the same. On the side of the end piece 14 located opposite the gears 12, a respective axial bearing 13 is provided. Neither the axial bearings 13 nor the gears 12 may be directly seated against the end piece 14 so as to ensure the mobility of the camshafts 2.

Figure 4:
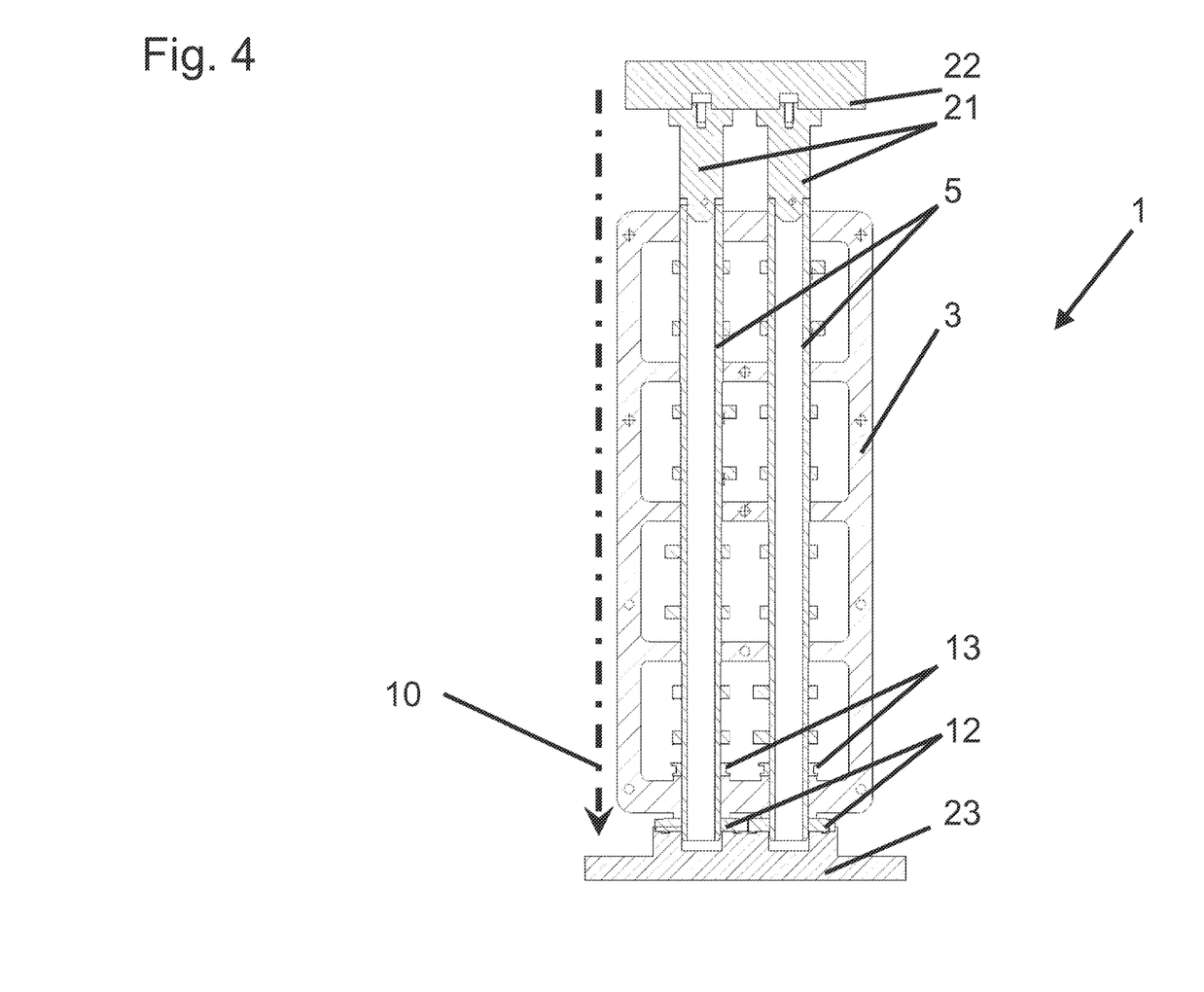
FIG. 4 shows a further schematic sectional illustration of a state during production of a camshaft module in accordance with an embodiment of the present invention.

FIG. 4 shows a camshaft module 1 during production. The shafts 5 are moved here into the bearing frame 3 in the insertion direction 10, which in the drawing is downward. For this purpose, rams 21, which can be moved individually by a force application device 22, act on the shafts 5. A stop surface 23 is located on the opposite side (here at the bottom of the drawing), in the cut-outs of which the functional elements 12—these being gears—are seated and which offer sufficient maneuvering space for the shafts 5. During production according to the above method, the shafts 5 are moved simultaneously in one embodiment. In the following steps for attaching the functional elements 12, the shafts 5 are preferably moved only individually, which is to say the rams 21 are operated individually.

In a first step, a shaft 5 is partially introduced into the cut-out of the functional element 12. Then, the distance between the functional element 12 and the reference element 13, which here is an axial bearing, is measured and compared to a target distance. Based on the result of the comparison, which is to say in particular the determination of the difference between the two values, the shaft 5 is moved further, so that the desired distance is obtained, and overall an interference fit develops between the functional element 12, which is to say the gear, and the shaft 5.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for producing a camshaft module, the camshaft module including at least one camshaft having a shaft and a plurality of cams each having a cam cut-out, and a bearing frame configured to hold the at least one camshaft rotatably in a plurality of bearing devices, the plurality of bearing devices each having a bearing cut-out, the method comprising the steps of:
   securing the bearing frame such that the bearing frame is supported substantially rigidly against motion in a direction parallel to a shaft insertion direction and is resiliently supported movably in a direction perpendicular to the shaft insertion direction;
   arranging a number of the plurality of cams corresponding to each shaft of the at least one camshaft in the bearing frame with each cam cut-out of said number of the plurality of cams co-axially aligned with the bearing cut-outs of a portion of the plurality of bearing devices corresponding to the shaft of the at least one camshaft; and
   inserting the shaft of the at least one camshaft into the bearing frame in the shaft insertion direction at least through the cam cut-outs of said number of the plurality of cams and the bearing device cut-outs of said portion of the plurality of bearing devices such that the shaft is supported in the bearing frame and an interference fit is obtained between the shaft and at least one cam of said number of the plurality of cams.

2. The method according to claim 1, wherein
   at least one bearing devices is formed with the bearing frame.

3. The method according to claim 1, wherein
   the inserting act is conducted at substantially room temperature free of heating and cooling of individual components of the camshaft module.

4. The method according to claim 1, wherein
   the inserting act is conducted without a locking agent.

5. The method according to claim 1, further comprising the act of:
measuring during the inserting act a shaft insertion force applied to the shaft.

6. The method according to claim 1, wherein the inserting act includes
determining a distance between one of a cam of the plurality of cams and a bearing device of the plurality of bearing devices and a reference element,
comparing the determined distance to a predefined target distance, and
applying a force to the shaft based on the result of the comparison.

7. The method according to claim 6, wherein the distance is determined while no axial force is applied to the shaft.

8. The method according to claim 1, wherein the shaft is a stepped shaft, the cams of the plurality of cams have different cut-out diameters,
the bearing devices of the plurality of bearings devices have different cut-out diameters, and
the plurality of cams are arranged relative to the bearing frame such that diameters of the cam cut-outs of the cams comprised by the at least one camshaft and diameters of the bearing device cut-outs of bearing devices assigned to hold the at least one camshaft become smaller in the shaft insertion direction.

9. The method according to claim 8, wherein the interference fit is obtained by the inserting act.

10. The method according to claim 1, wherein the camshaft module comprises two camshafts each comprising a shaft and a plurality of cams each having a cam cut-out, and
the bearing frame is configured to hold the two camshafts rotatably in the plurality of bearing devices.

* * * * *